US008607548B2

(12) United States Patent
Zayan

(10) Patent No.: US 8,607,548 B2
(45) Date of Patent: Dec. 17, 2013

(54) SCR AMMONIA SLIP DETECTION

(75) Inventor: Nicholas Michael Zayan, Fenton, MI (US)

(73) Assignee: AVL North America, Inc., Plymouth, MI (US)

( * ) Notice: Subject to any disclaimer, the term of this patent is extended or adjusted under 35 U.S.C. 154(b) by 145 days.

(21) Appl. No.: 13/267,174

(22) Filed: Oct. 6, 2011

(65) Prior Publication Data

US 2012/0085083 A1 Apr. 12, 2012

Related U.S. Application Data

(60) Provisional application No. 61/390,377, filed on Oct. 6, 2010.

(51) Int. Cl.
*F01N 3/00* (2006.01)

(52) U.S. Cl.
USPC ............. 60/286; 60/277; 60/299; 60/301; 123/488; 701/109; 702/190

(58) Field of Classification Search
USPC ............. 60/274–324; 123/488; 701/109, 114; 702/189, 190, 196, 197
See application file for complete search history.

(56) References Cited

U.S. PATENT DOCUMENTS

| | | | | |
|---|---|---|---|---|
| 6,625,569 B2 * | 9/2003 | James et al. | | 702/183 |
| 7,171,301 B2 * | 1/2007 | Yu et al. | | 701/114 |
| 2004/0244361 A1 * | 12/2004 | Tanabe et al. | | 60/274 |
| 2007/0199307 A1 * | 8/2007 | Tsumagari | | 60/286 |
| 2008/0010973 A1 * | 1/2008 | Gimbres | | 60/276 |
| 2009/0185954 A1 * | 7/2009 | Qi et al. | | 422/62 |
| 2010/0024389 A1 | 2/2010 | Gady et al. | | |
| 2010/0050597 A1 | 3/2010 | Crehan | | |
| 2010/0242454 A1 * | 9/2010 | Holderbaum | | 60/301 |
| 2011/0005203 A1 * | 1/2011 | Gady | | 60/276 |
| 2011/0005209 A1 | 1/2011 | Gady et al. | | |
| 2011/0138779 A1 | 6/2011 | Neumayer | | |
| 2011/0203259 A1 | 8/2011 | Upadhyay et al. | | |

FOREIGN PATENT DOCUMENTS

WO 2010082354 A1 7/2010

OTHER PUBLICATIONS

European Search Report for EP Application No. 11184211.8, Jan. 26, 2012.

* cited by examiner

*Primary Examiner* — Thomas Denion
*Assistant Examiner* — Jesse Bogue
(74) *Attorney, Agent, or Firm* — Harness, Dickey & Pierce, P.L.C.

(57) ABSTRACT

In one implementation of the disclosed technique, a NOx sensor polynomial algorithm is used to discriminate between NOx and ammonia emission. The polynomial algorithm uses the SCR's time constant property to infer the "loading state" of the SCR and estimate both the NOx conversion and quantity of ammonia slip. The polynomial algorithm assesses this by differentially analyzing the upstream and downstream NOx sensor signals through a comparison of the polynomial coefficients.

14 Claims, 3 Drawing Sheets

SCR AMMONIA SLIP DETECTION

This application claims priority to U.S. Provisional Application No. 61/390,377, filed on Oct. 6, 2010.

BACKGROUND

This disclosure relates to estimating ammonia slip using upstream and downstream NOx sensor signals. This disclosure also relates to estimating NOx conversion by the catalyst.

Modern diesel exhaust systems use a selective catalyst reduction (SCR) system to reduce NOx in the exhaust. In one type of SCR system, urea or ethanol reductant is used over a SCR substrate to reduce engine NOx emissions. A NOx sensor placed upstream of the catalyst is used to determine the quantity of reductant needed. A NOx sensor placed downstream of the SCR is used to measure the amount of unconverted NOx exiting the catalyst, monitoring conversion performance. SCR system performance is measured by the amount of reduction of upstream NOx using a model-based control algorithm. That is, known reaction chemistry adsorption and conversion rate embedded in the controller software are used to model the function of the SCR system. The model is used to control reductant injection to give desired reduction, or conversion, of NOx.

There are at least two problems with the above-described control methodology. First, rate-based physical models are sufficiently inaccurate. Second, NOx sensors is significantly cross-sensitive to ammonia. As a result, the downstream sensor cannot distinguish between poor conversion and ammonia emission. This situation can result in an undesirable operating state. Excessive reductant may build-up on the SCR surface, causing generation of ammonia and ammonia emission ("ammonia slip"). Once this operating state occurs, direct assessment of the downstream NOx sensor is inconclusive for determining if poor NOx conversion exists and undesired NOx are being emitted or if ammonia generation is occurring.

SUMMARY

A method of monitoring SCR function includes the steps of injecting reductant into a catalyst. Upstream and downstream NOx is detected relative to a catalyst and producing, respectively, upstream and downstream NOx signals. The upstream and downstream NOx signals are evaluated, and, based upon the evaluation, NOx conversion is estimated to provide an estimated NOx emissions. Downstream ammonia is estimated to provide an estimated downstream ammonia. An adjusted amount of reductant is injected into the catalyst based upon the estimated downstream ammonia.

An apparatus for detecting ammonia in an exhaust system includes a computing device programmed to receive first and second NOx signals respectively corresponding to upstream and downstream NOx measurements. The computing device contains logic configured to distinguish an ammonia content from the downstream NOx measurement. The logic includes a generation of polynomial coefficients from the first and second NOx signals, a comparison the polynomial coefficients, and a calculation of unconverted NOx based upon the comparison. The unconverted NOx corresponds to an estimated downstream ammonia.

BRIEF DESCRIPTION OF THE DRAWINGS

The disclosure can be further understood by reference to the following detailed description when considered in connection with the accompanying drawings wherein.

DETAILED DESCRIPTION

Figure 1:
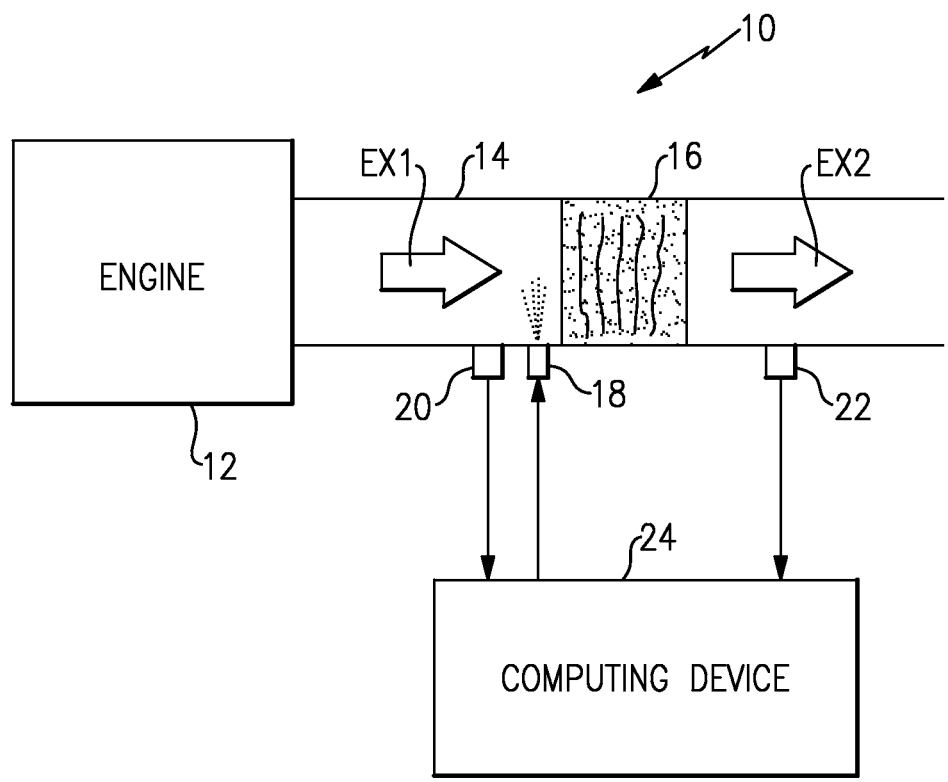
FIG. 1 is a highly schematic view of an example SCR system according to this disclosure.

An example SCR system 10 is illustrated in FIG. 1. The system 10 includes an engine 12, which is a diesel internal combustion engine in one example. The engine 12 produces exhaust Ex1 expelled through an exhaust system 14. The exhaust Ex1 may include an undesired amount of NOx emissions. To this end, a system 10 employs a catalyst 16 arranged in the exhaust system 14. A reductant is introduced using an injector 18 typically arranged upstream from the catalyst 16 to produce an exhaust Ex2 with reduced NOx. The injector 18 is in communication with the computing device 24. It should be understood that the catalyst 16 and injector 18 may be configured other than described.

The injector 18 is in communication with a reductant storage container, which is not illustrated in FIG. 1. The amount of reductant injected into the exhaust system 14 is regulated to achieve desired efficiency of the catalyst 16. If too little reductant is used, an insufficient amount of NOx will be converted by the catalyst 16. If too much reductant is used, ammonia will be produced by the catalyst in a condition known as "ammonia slip." First and second NOx sensors 20, 22 are respectively arranged upstream and downstream from the catalyst 16. The NOx sensors 20, 22 are in communication with a computing device 24, which monitors the effectiveness of the SCR system in some manner. Ammonia slip can be mistaken for NOx by the downstream NOx sensor, which results in erroneous control of the injector 18.

In one implementation of the disclosed technique, a NOx sensor polynomial algorithm is used to discriminate between NOx and ammonia emission. These results can be used for either direct closed-loop control or diagnostic confirmation of a closed-loop control scheme. Generally, the polynomial algorithm uses the SCR's time constant property to infer the "loading state" of the SCR and estimate both the NOx conversion and quantity of ammonia slip. The polynomial algorithm assesses this by differentially analyzing the upstream and downstream NOx sensor signals through a comparison of the polynomial coefficients.

The SCR catalyst readily adsorbs the reductant fluid, but does not have a high affinity for NOx. This can causes significantly different adsorption/desorption "time constants" for each of the gas components, NOx and reductant. An intermediate reaction of the SCR system 10 is the generation of ammonia. In low surface concentrations, the $NH_3$ gas species is re-adsorbed on the SCR surface and is consumed in the $NOx \rightarrow N_2$ reaction. In larger concentrations (higher reductant rates) some of the $NH_3$ "slips" out of the SCR. The amount of reductant adsorbed on the SCR surface affects NOx conversion and the slip of NOx and ammonia according to the following four conditions.

No Load Condition:

no adsorbed reductant; with no reductant, NOx passes through the SCR with no conversion. The upstream and downstream NOx sensor signatures are amplitude and phase similar.

Light Load Condition:

a small amount of adsorbed reductant; some NOx conversion occurs, measured as a reduction of NOx in the downstream with respect to the upstream location. The reaction favors conversion, not ammonia generation, since the concentration of incoming NOx overwhelms the reductant concentration. This leaves an insufficient quantity of adsorbed $NH_3$ to cause slip. The upstream and downstream NOx sensors signals are amplitude different (the downstream signal is smaller than the upstream), but phase similar (both sensors increase and decrease and the same time).

Critical Load Condition:

sufficient concentration of reductant is adsorbed by the SCR; conversion of NOx is high, $NH_3$ slip is minimal. The upstream NOx sensor reads the engine out NOx concentration, and the downstream NOx sensor reads near zero. The inlet quantity of engine-out NOx is equal to the surface concentration of reductant needed to cause near complete conversion reactions.

Over-Load Condition:

a high amount of reductant is adsorbed by the SCR; there is relatively insufficient engine-out NOx. The SCR converts all NOx, but some of the excess reductant is converted to $NH_3$ and releases as $NH_3$ slip. The downstream slip condition contains no high frequency information; slip appears as a low-frequency emission phenomena. The upstream and downstream NOx sensors have neither phase nor amplitude correlation.

The signal processing algorithm relies upon the significantly different temporal sensor signatures imparted by the property of the SCR with respect to the different gas species. A downstream estimate of ammonia slip and NOx conversion are calculated from upstream and downstream NOx sensors by quantifying signal temporal information.

Figure 2:
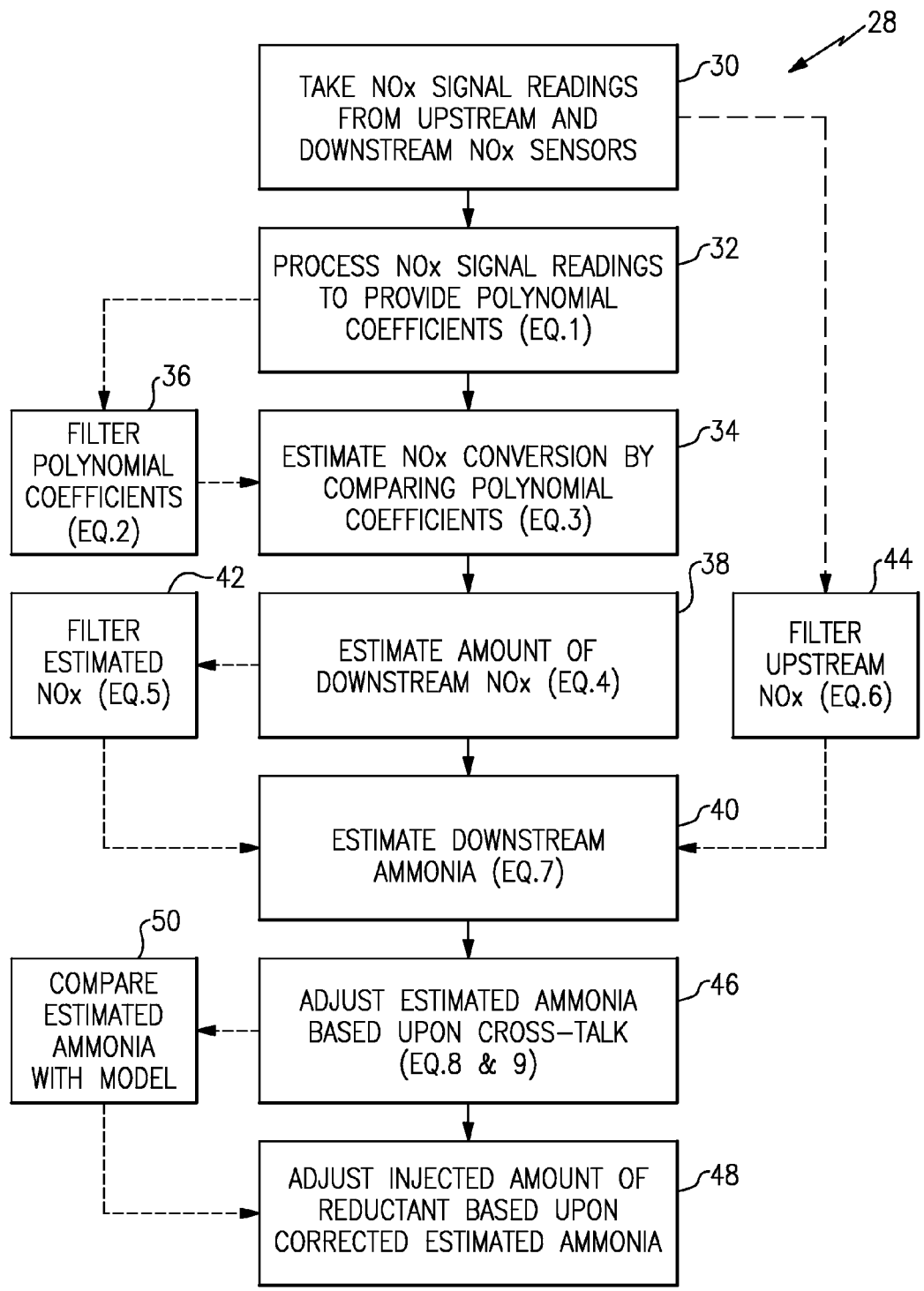
FIG. 2 is a flow chart depicting the disclosed method of detecting ammonia slip in the SCR system shown in FIG. 1.

A segment of each sensor signal, or wavelet, is fit using a $n^{th}$ order polynomial. The outputs of polynomial fitting routine are n+1 order coefficients and statistical quality of fit results. Generally, a comparison of upstream and downstream results is used to infer the state of the SCR. The example disclosed processing method, illustrated at 28 in FIG. 2, uses the following algorithm, which is a polynomial representation of a portion of the sensor signal.

$$NOXsns(t) = X0*t0 + X1*t1 + X2*t2 + \ldots + Xn*tn \quad \text{(Equation 1)}$$

wherein,
t=time
NOXsns(t)=estimate of the NOx sensor data at time "t"
$X0 = 0^{th}$ polynomial fit coefficient
$X1 = 1^{st}$ order polynomial fit coefficient
$X2 = 2^{nd}$ order polynomial fit coefficient
$Xn = n^{th}$ order polynomial fit coefficient NOx signal readings from the upstream and downstream NOx sensors 20, 22 are taken, as indicated at block 30. The NOx signals are processed to provide polynomial coefficients according to Equation 1, as indicated at block 32. The polynomial coefficients may be filtered, as indicated at block 36. In one example, a low-pass filter is used with the coefficient set to remove fitting noise and create a smoothed coefficient set, as a function of time (recursive 1 pole low-pass filtering (lp) according to Equation 2 below.

$$Xn, lp = lp(Xn, Xn, lp) \quad \text{(Equation 2)}$$

The NOx conversion (NOXconv) of the catalyst 16 is estimated, as indicated at block 34, by comparing the $0^{th}$ order coefficients, for example, as illustrated by Equation 3. Such an approach is the simplest algorithm, however, it should be understood that more complex variants using higher order coefficients and/or polynomial quality-of-fit may also be used.

$$NOXconv = dsX0, rms/usX0, rms \quad \text{(Equation 3)}$$

The quantity of NOx detected by the downstream NOx sensor 22 is estimated (dsNOXest), as indicated at block 38, based on the conversion (NOXconv) of upstream NOx (usNOX). In one example, dsNOXest is limited to actual sensor signal limits.

$$dsNOXest = usNOX*NOXconv \quad \text{(Equation 4)}$$

Respectively referring to blocks 42 and 44, the upstream NOx (actual) and downstream NOx (estimate) are filtered using a low-pass filter, for example. The filtered values are represented by usNOXlp and dsNOXlp.

$$usNOXlp = lp(usNOX, usNOXlp) \quad \text{(Equation 5)}$$

$$dsNOXlp = lp(dsNOXest, dsNOXlp) \quad \text{(Equation 6)}$$

Ammonia at the downstream location is estimated, as indicated at block 40, as the quantity of the downstream signal (dsNOxlp) less the unconverted upstream NOx, which is based upon the actual upstream NOx (usNOxlp) and the converted NOx (NOXconv)

$$dsNH3est = dsNOxlp - usNOxlp*(1 - NOXconv) \quad \text{(Equation 7)}$$

The NOx sensor cross-talk sensitivity to $NH_3$ (NOx_NH3_xtalk) is concentration dependent and is a function of the NOx sensor characteristics. In one example, for simplicity, a constant value of approximately 0.6 is used.

$$NOx\_NH3\_xtalk \leq 0.6(ppmNOX/ppmNH3) \quad \text{(Equation 8)}$$

The "cross-talk" corrected estimate of ammonia in the downstream, which is indicated in block 46, is therefore:

$$dsNH3corr = dsNH3est/NOx\_NH3\_xtalk \quad \text{(Equation 9)}$$

The amount of reductant injected into the exhaust system 14 may be adjusted by the computing device 24, as indicated at block 48, to achieve desired loading of the catalyst 16 for efficient SCR system operation. The above method may also be used as a confirmation on a model-based ammonia estimating approach used by the computing device, as indicated at block 50.

The operational constraint is engine-out NOx should contain high frequency information, i.e. transient sensor response output. As the engine cycle moves toward steady-state operation, high frequency information is lost and the method becomes indeterminate.

Figure 3:
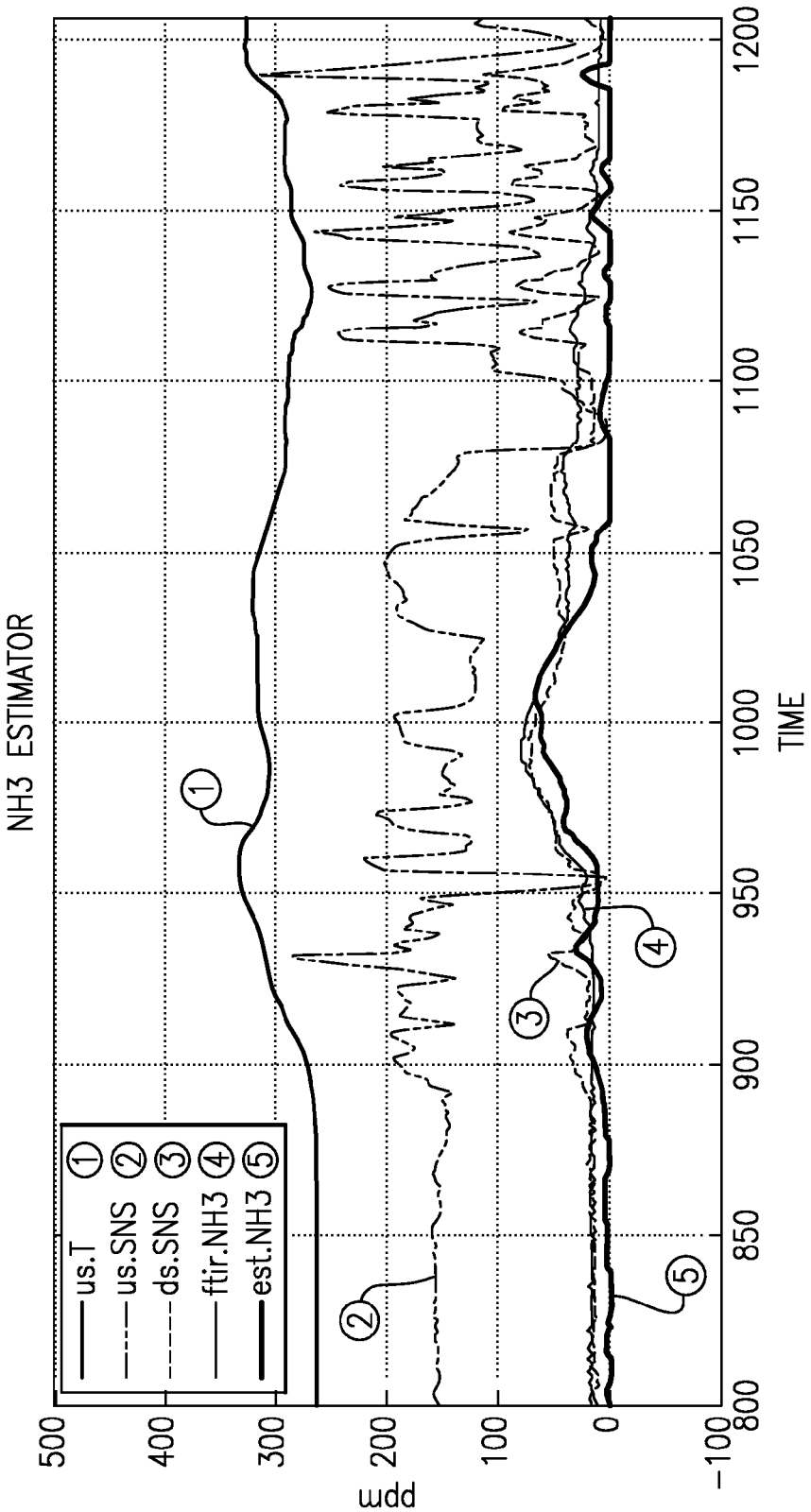
FIG. 3 is a graph depicting various signals associated with the disclosed SCR system and method.

FIG. 3 illustrates signals associated with the disclosed SCR system and method. Line (1) corresponds to the upstream temperature (usT). Lines (2) and (3) respectively correspond to the raw upstream and downstream NOx signals (usSNS, dsSNS). Line (4) corresponds to the actual ammonia (ftirNH3) measured downstream from the catalyst. Line (5) corresponds to the estimated ammonia (estNH3) according to Equation 9. As can be appreciated from the graph, the estimated ammonia closely approximates the actual ammonia. The disclosed polynomial algorithm has at least twice the response time as a frequency decomposition method that utilizes multi-pole recursive filtering. Such a method takes the broad frequency bands (low-pass and high-pass) components present in the original sensor signals and converts them to magnitude using an RMS approximation calculation. These magnitudes could then be compared to infer NOx conversion and ammonia slip. The recursive filter operating at a very low cut-off frequency cause the computational results to significantly lag the NOx signals.

It should be noted that a computing device, which may be several discrete units or an integrated unit, can be used to implement various functionality described in this disclosure. In terms of hardware architecture, such a computing device can include a processor, memory, and one or more input and/or output (I/O) device interface(s) that are communicatively coupled via a local interface. The local interface can include, for example but not limited to, one or more buses and/or other wired or wireless connections. The local interface may have additional elements, which are omitted for simplicity, such as controllers, buffers (caches), drivers, repeaters, and receivers to enable communications. Further, the local interface may include address, control, and/or data connections to enable appropriate communications among the aforementioned components.

The processor may be a hardware device for executing software, particularly software stored in memory. The processor can be a custom made or commercially available processor, a central processing unit (CPU), an auxiliary processor among several processors associated with the computing device, a semiconductor based microprocessor (in the form of a microchip or chip set) or generally any device for executing software instructions.

The memory can include any one or combination of volatile memory elements (e.g., random access memory (RAM, such as DRAM, SRAM, SDRAM, VRAM, etc.)) and/or nonvolatile memory elements (e.g., ROM, hard drive, tape, CD-ROM, etc.). Moreover, the memory may incorporate electronic, magnetic, optical, and/or other types of storage media. Note that the memory can also have a distributed architecture, where various components are situated remotely from one another, but can be accessed by the processor.

The software in the memory may include one or more separate programs, each of which includes an ordered listing of executable instructions for implementing logical functions. A system component embodied as software may also be construed as a source program, executable program (object code), script, or any other entity comprising a set of instructions to be performed. When constructed as a source program, the program is translated via a compiler, assembler, interpreter, or the like, which may or may not be included within the memory.

When the computing device is in operation, the processor can be configured to execute software stored within the memory, to communicate data to and from the memory, and to generally control operations of the computing device pursuant to the software. Software in memory, in whole or in part, is read by the processor, perhaps buffered within the processor, and then executed.

Although an example embodiment has been disclosed, a worker of ordinary skill in this art would recognize that certain modifications would come within the scope of the claims. For that reason, the following claims should be studied to determine their true scope and content.

What is claimed is:

1. A method of monitoring SCR function comprising the steps of: injecting reductant into a catalyst; detecting upstream and downstream NOx relative to a catalyst and producing, respectively, upstream and downstream NOx signals; evaluating the upstream and downstream NOx signals, and, based upon the evaluation, estimating NOx conversion to provide an estimated NOx emissions; estimating downstream ammonia to provide an estimated downstream ammonia; and injecting an adjusted amount of reductant into the catalyst based upon the estimated downstream ammonia;

wherein the evaluating step includes sampling corresponding time segments of each of the upstream and downstream NOx signals, and fitting each of the sampled time segments to an $n_{th}$ order polynomial to produce upstream $n_{th}$ order polynomial coefficients and downstream $n_{th}$ order polynomial coefficients, wherein the evaluating step includes comparing the upstream $n_{th}$ order polynomial coefficients and the downstream $n^{th}$ order polynomial coefficients.

2. The method according to claim 1, wherein the NOx estimating step includes estimating downstream NOx quantity.

3. The method according to claim 2, wherein the downstream NOx quantity estimate corresponds to the upstream NOx signal multiplied by the NOx conversion estimate.

4. The method according to claim 3, wherein the NOx conversion estimating step includes comparing $0^{th}$ order coefficients.

5. The method according to claim 3, wherein the downstream ammonia estimating step includes subtracting an unconverted upstream NOx from the downstream NOx signal.

6. The method according to claim 3, wherein an unconverted upstream NOx corresponds to the product of the upstream NOx signal and the percentage of unconverted NOx.

7. The method according to claim 6, wherein the upstream NOx signal and the downstream NOx quantity estimate are filtered values.

8. The method according to claim 5, comprising the step of correcting the estimated downstream ammonia by applying a NOx sensor cross-talk factor.

9. The method according to claim 1, comprising the step of filtering the $n^{th}$ order polynomial coefficients.

10. The method according to claim 1, comprising the step of determining a model-based NOx conversion, comparing the estimated NOx conversion with the model-based NOx conversion, and adjusting the NOx conversion estimate based upon the comparison between the estimated NOx conversion and the model-based NOx conversion.

11. The method according to claim 1, wherein the estimated downstream ammonia corresponds to one of no load, light load, critical load and over load catalyst conditions, and the injecting step includes injecting more reactant in no load and light load catalyst conditions, and injecting less reactant in over load catalyst conditions.

12. An apparatus for detecting ammonia in an exhaust system comprising: a computing device programmed to receive first and second NOx signals respectively corresponding to upstream and downstream NOx measurements, the computing device including a non-transient program embodied on a tangible computer-readable medium and containing logic configured to distinguish an ammonia content from the downstream NOx measurement, the logic including a generation of first polynomial coefficients from the first NOx signals and a generation of second polynomial coefficients from the second NOx signals, a comparison of the first polynomial coefficients and the second polynomial coefficients, and a calculation of unconverted NOx based upon the comparison, the unconverted NOx corresponding to an estimated downstream ammonia.

13. The apparatus according to claim 12, comprising a catalyst, and first and second NOx sensors in communication with the computing device and respectively arranged upstream and downstream from the catalyst, and an injector arranged upstream from the catalyst and configured to inject reactant into an exhaust stream in response to a command from the computing device based upon the uncovered NOx.

14. The apparatus according to claim 12, wherein the estimated downstream ammonia corresponds to one of no load, light load, critical load and over load catalyst conditions, and the computing device is configured to command the injector to inject more reactant in no load and light load catalyst conditions, and inject less reactant in over load catalyst conditions.

<p style="text-align:center">* * * * *</p>

UNITED STATES PATENT AND TRADEMARK OFFICE
CERTIFICATE OF CORRECTION

| | |
|---|---|
| PATENT NO. | : 8,607,548 B2 |
| APPLICATION NO. | : 13/267174 |
| DATED | : December 17, 2013 |
| INVENTOR(S) | : Nicholas Michael Zayan |

It is certified that error appears in the above-identified patent and that said Letters Patent is hereby corrected as shown below:

In the Claims

Column 5,
Lines 64, 65, 66, and 67, (Claim 1), "$n_{th}$" should be --$n^{th}$--.

Column 6,
Line 2, (Claim 1), "n.sup.th" should be --$n^{th}$--.
Line 10, (Claim 4), "0.sup.th" should be --$0^{th}$--.
Line 28, (Claim 9), "n.sup.th" should be --$n^{th}$--.

Signed and Sealed this
Twenty-seventh Day of May, 2014

Michelle K. Lee
*Deputy Director of the United States Patent and Trademark Office*